Dec. 18, 1934.  E. ALTERIO ET AL  1,984,352
SELF EQUALIZING BRAKE MECHANISM FOR VEHICLES
Filed Dec. 19, 1933  2 Sheets-Sheet 1
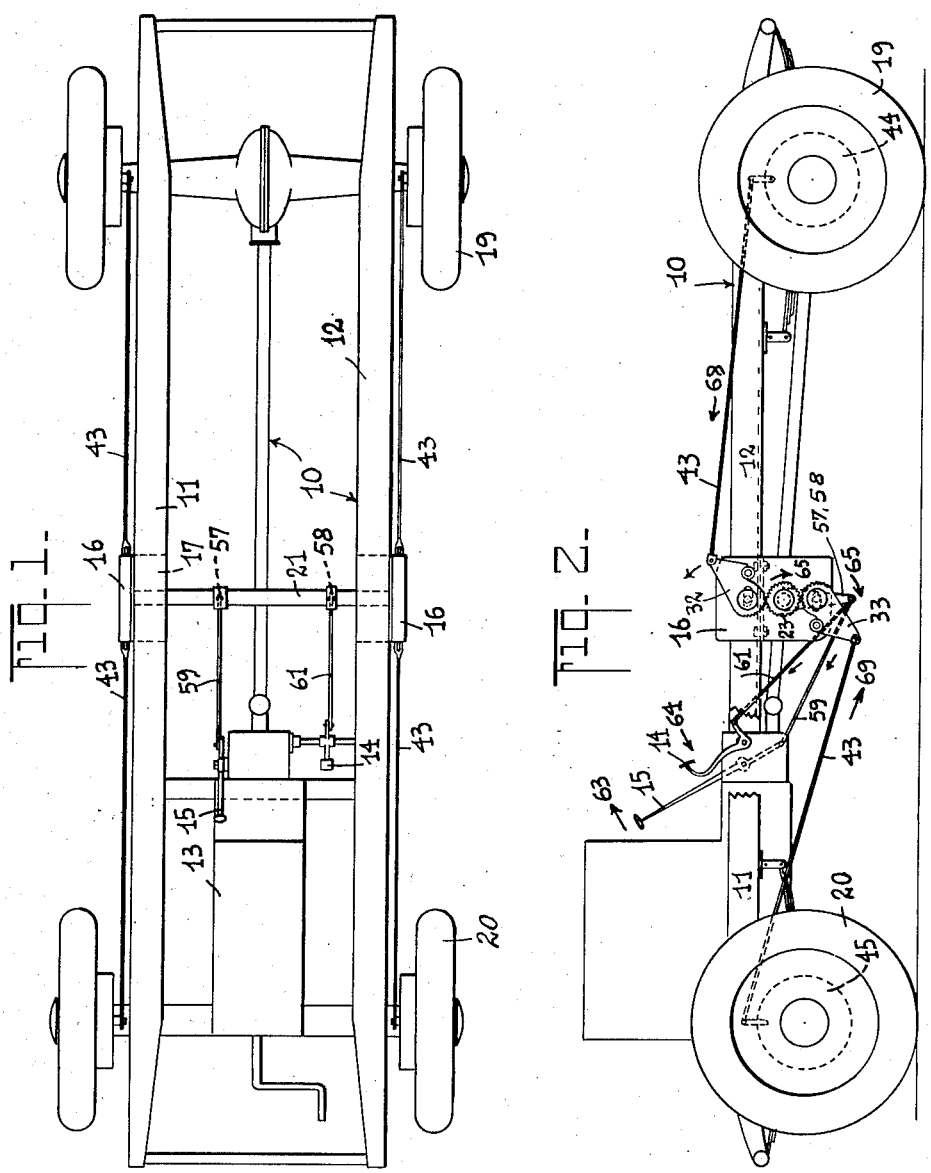
EUGENE ALTERIO,
AND JOSEPH F. CLEMENTS,
INVENTORS,
BY Julian J. Wittel
their ATTORNEY.

Dec. 18, 1934. E. ALTERIO ET AL 1,984,352
SELF EQUALIZING BRAKE MECHANISM FOR VEHICLES
Filed Dec. 19, 1933 2 Sheets-Sheet 2
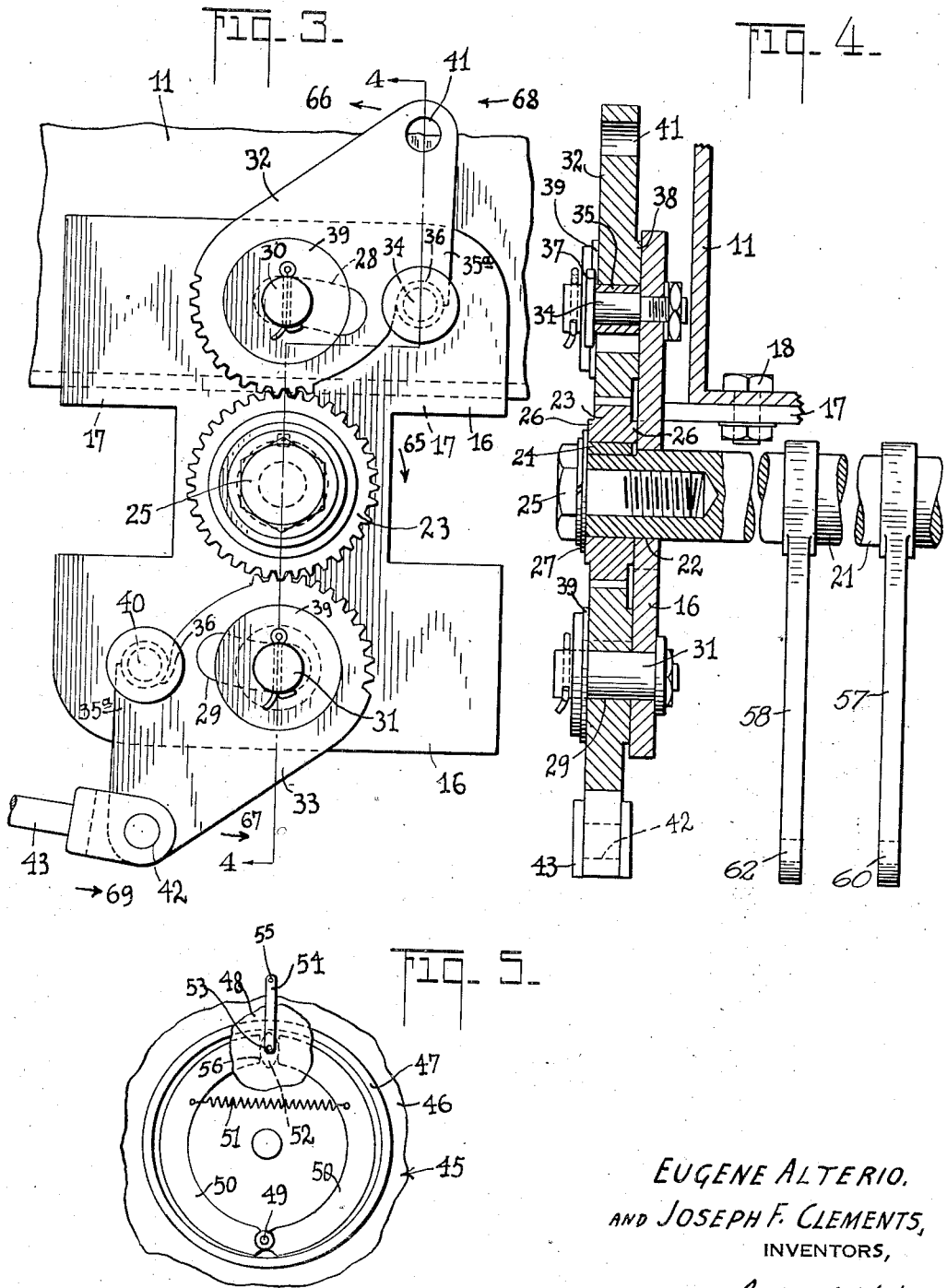
EUGENE ALTERIO,
AND JOSEPH F. CLEMENTS,
INVENTORS,
BY Julian J. Wittal,
their ATTORNEY.

Patented Dec. 18, 1934

1,984,352

UNITED STATES PATENT OFFICE 1,984,352

SELF-EQUALIZING BRAKE MECHANISM FOR VEHICLES

Eugene Alterio and Joseph F. Clements, New York, N. Y.

Application December 19, 1933, Serial No. 703,036

4 Claims. (Cl. 188—204)

This invention relates to brake mechanisms for vehicles and particularly for automobiles and has for its main object to provide a device in connection with any of the usual standard brakes on automobile wheels whereby said brakes on the various wheels may be operated simultaneously.

Another object of our invention is to provide a brake operating mechanism which will be adapted to exert a substantially uniform braking force on every individual brake even if the various brakes on the wheels of an automobile are in different conditions, some of them being relatively loose, the others relatively tight and requiring different force for actuating the same in a uniform manner.

Our device, in a word, mainly aims to provide a brake operating mechanism for automobiles whereby substantially uniform brake action will be exerted on each wheel and each wheel will be simultaneously and uniformly released from the brake action, when so desired, thereby avoiding the many drawbacks and dangers caused by uneven and not simultaneous braking actions on the individual wheels of an automobile, well known to all those versed in this art.

Other objects of our invention will be apparent as the specification of the same proceeds and among others we may mention: to provide a brake operating mechanism for automobiles of the character described hereinbefore which will be comparatively simple in construction, inexpensive to manufacture, reliable in operation, and which will be adapted to be applied to automobiles of existing construction and brake types without undue expense or change in the construction of the automobile.

In the drawings forming a part of this application and accompanying the same:

Fig. 1 is a diagrammatical plan view of the undercarriage or chassis of an automobile indicating our brake operating and compensating or equalizing mechanism applied thereto;

Fig. 2 is a diagrammatical side elevation of the chassis of an automobile shown in Fig. 1;

Fig. 3 is a detail elevational view of a frame or plate secured on the chassis of the automobile and carrying the main operating parts of our device, while Fig. 4 is a sectional elevation thereof, the section being taken on the line 4—4 of Fig. 3;

Fig. 5 is a diagrammatical fragmentary detail of one construction of an automobile brake to which our device may be applied.

Referring now more closely to the drawings by characters of reference, the numeral 10 indicates the chassis or undercarriage of an automobile, in general, having the right handed and left handed main beams 11 and 12. In our drawings the motor 13 of the automobile is also shown in a diagrammatic manner as well as the foot pedal 14 designed to operate the brakes of the automobile and the hand brake lever 15, both of them being well known and standard equipment of the automobiles used at present.

In the embodiment of our invention shown in the drawings, a plate or frame 16 is preferably secured on the outer side of each main beam 11 and 12, each by separating a portion 17 of said plate 16 bending it out at an angle thereto and securing the same to the underside of the respective beam 11 or 12 as by the bolts 18.

Plates 16 are secured intermediate the rear wheels and front wheels 19 and 20 of the automobile opposite one another. An auxiliary shaft 21 is arranged between said two plates passing through each of them at its two ends and being journalled therein, as will be described presently. Shaft 21 is journalled in a rotatable manner adjacent to each end thereof in the respective plates 16, as at 22, and each outer end of said shaft carries a gear 23 firmly secured thereon, as by the key 24. Each gear 23 is secured on the respective shaft end through the bolt construction 25, best shown in Fig. 4, so that said gear may rotate with the said shaft and, at the same time, be firmly and securely braced on its raised hub portions 26 between a large washer 27 and the respective plate 16. Suitably curved slots 28 and 29 may be provided in each plate 16 above and below the gear 23, respectively, and pins or bolts 30 and 31, respectively, may be slidably arranged in the curved slots 28 and 29, said pins 30 and 31 being secured in the plate 16.

A peculiarly shaped partly toothed segment 32 is arranged slidably and rockably on the upper pin 30 and a similar tooth segment 33 is similarly arranged on the lower pin 31, the two segments being oppositely placed both in vertical and lateral directions, as will be seen by inspecting Fig. 3.

A second pin or bolt 34 is further secured into the upper portion of the plate 16 having a roller member 35 on its portion projecting in front of the plate 16; and said upper segment 32 will have an extension 35ª with a curved portion 36 wherewith it may rest on the roller 35 in an easily rotatable and rockable manner. A head or washer 37 will prevent an axial movement of the portion 35ª on the pin 34, while the segment 32 generally will be further kept in a braced vertical position, though freely slidable and rockable in its plane, by the plate 16 engaging a raised hub portion 38 of said segment 32, the other side of said segment similarly engaging the washer 39 on the pin 30.

The lower oppositely placed rockable and slidable segment 33 will have identical parts to secure it in its position and will rest in an identical manner on the pin 40 of identical construction to the upper pin 34, though placed oppositely thereto.

The upper end of the toothed rockable segment 32 may have a hole 41 and the lower segment 33 will have a similar hole 42 into which link elements or rods 43 may be secured in a pivoted manner. The upper link members or rods 43 will operate on the rear wheel brakes 44 while the lower link rods 43 will operate on the front brakes 45.

One form of such brakes and their connection to our device is shown in a diagrammatic manner in Fig. 5, being a simplified, diagrammatical and fragmentary showing of a brake construction well known in the art. In this construction the fragmentary element 46 is a portion of the rotating wheel of the automobile and a brake drum or rim 47 is provided thereon and rotating therewith. On the respective axle housing or other permanent part of the automobile a brake housing 48 is secured, a broken away portion of which is only indicated in Fig. 5. A pin 49 is secured in such stationary part 48 resting within the space of the brake drum 47, as shown. Two brake shoes 50 are pivotally secured on said pin 49 and a spring 51 will normally pull said brake shoes towards one another and away from the brake drum 47. In one embodiment of our device an excentric member 52 is secured on a pin 53 pivoted in the stationary part 48 and an arm 54 is secured on said pin outside of the stationary housing 48. Our respective drive or pull rod or link member 43 will be connected to the end 55 of said arm 54 in a pivoted manner. It is understood that the excentric member 52 is placed between the terminations 56 of the brake shoes 50 and may operate between them.

The auxiliary shaft 21 may further have two arms 57 and 58 secured thereon and a pivoted link member or connecting rod 59 will connect the lower end of the hand brake lever 15 to the outer end 60 of the arm 57, and similarly a pivoted link member 61 will connect the lower end of the foot pedal 14 to the end 62 of the arm 58, in a pivoted manner.

The use and operation of our device now is, as follows:

When either the hand brake 15 or foot pedal brake 14 is pulled rearwardly or pushed forwardly into a braking position, as indicated by the arrows 63 and 64, respectively, auxiliary shaft 21 will be rocked in the direction indicated by the arrow 65 and gear 23 will rock in the same direction. The rocking of gear 23 will cause the upper segment 32 to rock in the direction of arrow 66 and the lower segment 33 to rock in the opposite direction, as indicated by the arrow 67, each segment slidingly rolling on the respective pins 34 and 40 and riding on the other pins 30 and 31 and pulling the respective upper and lower rods 43 in the directions of arrows 68 and 69. Said rods will rock the arms 54 on the respective brakes and thereby set the excentric pieces 52 longitudinally between the faces 56 of the brake shoes 50 and press them outwardly against the brake drums 47, as will be understood.

In this manner, a quick but still gradual, simultaneous, and entirely equalized force will be exerted on all the four brakes of the automobile.

When it is desired to release the braking action foot pedal 14 or hand brake lever 15 will be released, as is usual in the operation of an automobile, and the spring connected with such devices in every automobile for the purpose of returning them into their inactive positions will cause the various parts of our device also to return into their inoperative position. We, however, may also employ a special spring at any appropriate place in our mechanism to cause the same to positively return to inoperative position and release the brakes, when so desired.

While the embodiment of our invention herein described and shown is considered by us the preferred form thereof, we, however, want it to be understood that we reserve our rights to any changes, alterations and deviations in the construction thereof which may be made therein within the spirit of the invention and the scope of the appended claims.

What we claim as new, is:

1. In an equalizing automobile brake operating mechanism, a rockable shaft operated by the driver; slidable and rotatable elements rocked by said shaft, and operating link members connecting said slidable and rotatable elements to the brakes on the respective wheels of the automobile being adapted to put said brakes in an operative position or to release them, through the movement of said slidable and rotatable elements, as desired, said slidable and rotatable elements being in the form of toothed segments operated by gears on said shaft.

2. In an equalizing automobile brake operating mechanism, a rockable shaft operated by the driver; slidable and rotatable elements rocked by said shaft, and operating link members connecting said slidable and rotatable elements to the brakes on the respective wheels of the automobile being adapted to put said brakes in an operative position or to release them, through the movement of said slidable and rotatable elements, as desired, said slidable and rotatable elements being in the form of toothed segments operated by gears on said shaft, and said segments being also slidably and rotatably resting on stationary pins secured on the chassis of the automobile.

3. In an equalizing automobile brake operating mechanism, a rockable shaft operated by the driver; slidable and rotatable elements rocked by said shaft, and operating link members connecting said slidable and rotatable elements to the brakes on the respective wheels of the automobile being adapted to put said brakes in an operative position or to release them, through the movement of said slidable and rotatable elements, as desired, said slidable and rotatable elements being in the form of toothed segments operated by gears on said shaft, each segment being rockably but freely resting on a first pin, and each segment having a slot therein whereby to slide on a second pin, said pins being secured on the chassis of the automobile.

4. A brake operating and equalizing mechanism for automobiles, comprising a frame member secured at each side of the chassis of the automobile between the rear and the front wheels thereof; transversal auxiliary shaft journalled in said two frames adjacent its two ends; a gear secured at each end of said shaft; a toothed segment arranged on each of said frame members, both above and below each gear, the teeth of each segment meshing with the respective gear at the opposite sides thereof; a first pin secured in each frame for each segment; a curved portion of the respective segment resting on said pin in a freely slidable and rockable but supporting manner; a second pin in each frame for each segment, each segment having a curved slot for said second pins whereby to ride slidably thereon; a pivoted link member for each segment pivotally connecting to an element in a brake on a respective wheel of the automobile so that a moving of said link member will put said brake in operative position or will release the same, as desired, and means to connect the usual brake operating mechanisms, like the foot pedal, or the hand brake lever, of an automobile, with said shaft whereby the operation or the release of said brake operating mechanisms will rock said shaft in one or in the other direction.

EUGENE ALTERIO.
JOSEPH F. CLEMENTS.